A. B. RAMEY.
DEVICE FOR WATERING STOCK.
No. 185,869. Patented Jan. 2, 1877.
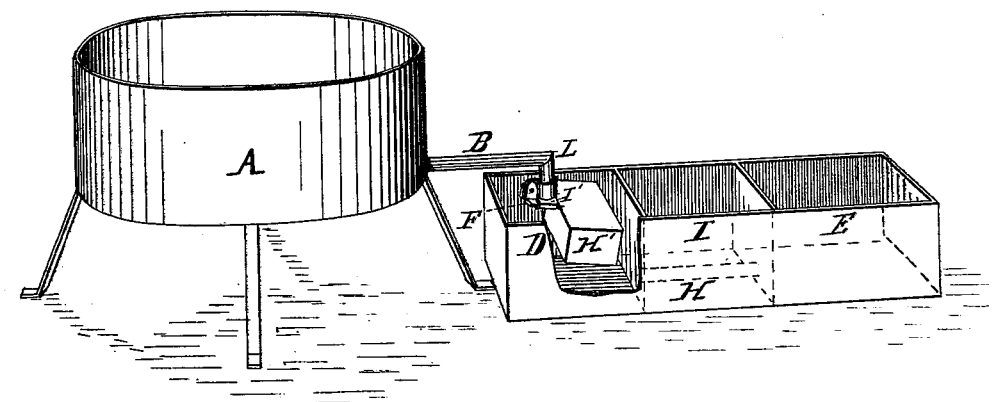
Witnesses:
Grenville Lewis
Chas. C. Gill
Inventor
Ambrose B. Ramey
by his Atty.
Cox & Cox.

UNITED STATES PATENT OFFICE.

AMBROSE B. RAMEY, OF LA BELLE, MISSOURI.

IMPROVEMENT IN DEVICES FOR WATERING STOCK.

Specification forming part of Letters Patent No. 185,869, dated January 2, 1877; application filed December 8, 1876.

*To all whom it may concern:*

Be it known that I, AMBROSE B. RAMEY, of La Belle, in the county of Lewis and State of Missouri, have invented a new and useful Improvement in Devices for Watering Stock, of which the following is a specification, reference being had to the accompanying drawings.

The invention relates to an improvement in devices for watering stock; and consists in the mechanism hereinafter specifically designated, the object being to provide a suitable means for watering cattle.

Figure 1 is a perspective view of a device embodying the elements of the invention.

In the accompanying drawings, A represents the pond, from which extends the tube or pipe B, whereby the water is conveyed to the tank D, and thence to the tank E, through the pipe H, placed near the bottom of the box I. The pipe or tube B enters the pond just below its upper surface at low tide, and may extend any desired distance from the same, its end being provided with the elbow L, in the rear of which is hinged the arm F, passing frontward, and rigidly secured to the float H. Upon the arm F, immediately beneath the mouth of the elbow L, is furnished the packing I', to effectually prevent the escape of water from the tube B when the valve is closed.

The float H' consists of a hollow rectangular or other suitably-configured body, capable of rising and falling as the surface of the water in the tank D, in which the float operates and is confined, rises or falls.

The tank D is connected with the tank E by means of the pipe H, through which water is conveyed from the tank D to the vessel or tank E, from which the cattle may drink.

In operation the tank D and box I are buried in the earth to prevent the water from freezing in winter, and to keep it cool in summer.

It is obvious that water flowing from the pond A through the pipe B would enter the tank D, and thence pass to the tank E by means of the pipe H, and that the water finding its own level would be on the same horizontal plane in the tanks. Thus, as the water rose in the tank E it would simultaneously rise in the tank D, thereby carrying upward the float H, and bringing the packing I' up against the mouth of the elbow L, effectually preventing the influx of more water, and the overflowing of the tanks.

It is also obvious that when part of the water has been consumed from the tank E the water will fall in the tank D, and the float H with it, thus opening the valve and allowing more water to enter the tanks and refill them.

What I claim as my invention, and desire to secure by Letters Patent, is—

1. In a device for watering stock, the float H', provided with the arm F and packing I', and hinged in the rear of the inlet-pipe, so that an automatic valve is formed, substantially as and for the purpose set forth.

2. In a device for watering stock, the pipe D, provided with the elbow L, in combination with the packing I', float H', and tanks D and E, substantially as expressed.

In testimony that I claim the foregoing improvement in devices for watering stock, as above described, I have hereunto set my hand this 29th day of November, 1876

AMBROSE B. RAMEY.

Witnesses:
WM. M. HARRIS,
J. HALDEMAN.